United States Patent
Betten

(10) Patent No.: US 12,141,918 B1
(45) Date of Patent: Nov. 12, 2024

(54) FLOOD FOOTPRINT ESTIMATION SYSTEM

(71) Applicant: CoreLogic Solutions, LLC, Irvine, CA (US)

(72) Inventor: Daniel Price Betten, San Francisco, CA (US)

(73) Assignee: CoreLogic Solutions, LLC, Irvine, CA (US)

( * ) Notice: Subject to any disclaimer, the term of this patent is extended or adjusted under 35 U.S.C. 154(b) by 874 days.

(21) Appl. No.: 17/181,909

(22) Filed: Feb. 22, 2021

(51) Int. Cl.
  *G06T 17/05* (2011.01)
  *G06F 16/29* (2019.01)
  *G06F 17/17* (2006.01)

(52) U.S. Cl.
  CPC .............. *G06T 17/05* (2013.01); *G06F 16/29* (2019.01); *G06F 17/17* (2013.01)

(58) Field of Classification Search
  CPC .......... G06T 17/05; G06F 16/29; G06F 17/17
  See application file for complete search history.

(56) References Cited

U.S. PATENT DOCUMENTS

2016/0047099 A1* 2/2016 Zhang .................... G06Q 10/04
  703/9

OTHER PUBLICATIONS

Longenecker HE, Graeden E, Kluskiewicz D, Zuzak C, Rozelle J, Aziz AL. A rapid flood risk assessment method for response operations and nonsubject-matter-expert community planning. Journal of Flood Risk Management. Mar. 2020;13(1):e12579. (Year: 2019).*
Nobre et al., Height above the Nearest Drainage, a hydrologically relevant new terrain model, Accepted Manuscript, 2011.
Nobre et al., Height above the Nearest Drainage, a hydrologically relevant new terrain model, Journal of Hydrology 404, pp. 13-29, 2011.

* cited by examiner

*Primary Examiner* — Chuen-Meei Gan
(74) *Attorney, Agent, or Firm* — Knobbe, Martens, Olson & Bear, LLP

(57) ABSTRACT

A flood footprint estimation system that can generate a requested flood footprint is described herein. For example, the flood footprint estimation system can estimate water surface elevations at various points along a stream or river. The flood footprint estimation system can then perform a smoothing operation on the estimated water surface elevations to generate a trend line or curve of the estimated water surface elevations in which each point of the trend line or curve corresponds to a water surface elevation value that is no greater than any of the water surface elevation values of the previous points of the trend line or curve. The flood footprint estimation system can use the trend line or curve to perform an iterative water expansion to determine which geographic locations may flood. Results of the iterative water expansion can be provided to a user device in the form of a user interface.

20 Claims, 8 Drawing Sheets

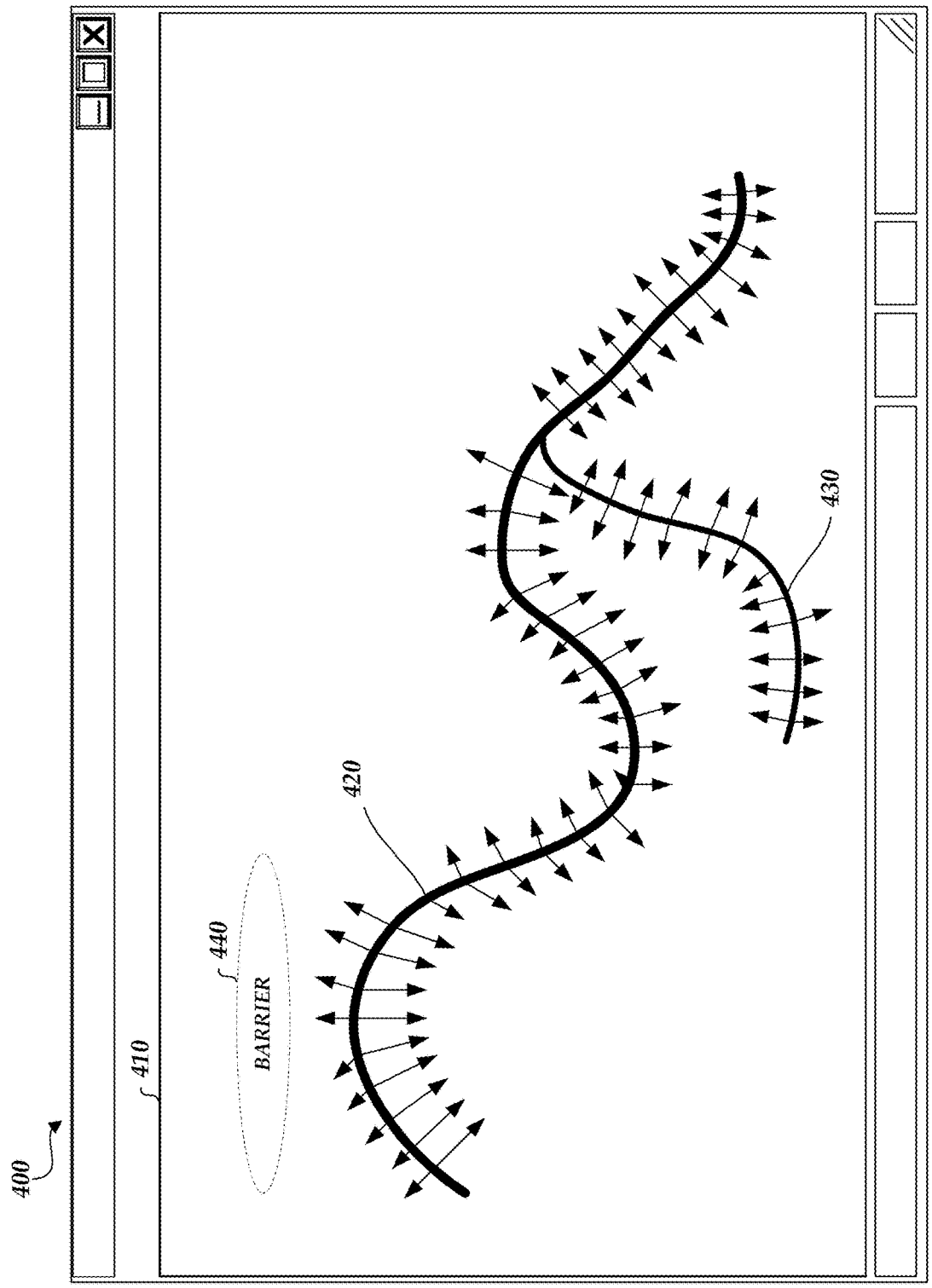

FLOOD FOOTPRINT ESTIMATION SYSTEM

TECHNICAL FIELD

The present disclosure generally relates to a flood footprint estimation system that uses geographic data and image processing to predict geographic locations that may be subject to flooding.

BACKGROUND

Structures may get damaged and/or loss of life may occur due to various environmental hazards, such as floods, storm surge, tornadoes, hurricanes, and/or other weather phenomena. Predicting when and at which locations such hazards may occur can help reduce the likelihood of structural damage and/or loss of life. Computing systems exist that execute algorithms to predict when and where such hazards may occur. Conventional algorithms used by computing systems to predict such hazards, however, can be inaccurate and/or computationally expensive to run. As a result, predictions produced by executing the conventional algorithms are less useful in mitigating the negative effects of various types of hazards.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a flood footprint estimation system for generating a flood footprint. The flood footprint estimation system comprises memory storing computer-executable instructions. The flood footprint estimation system further comprises a hardware processor in communication with the memory, where the computer-executable instructions, when executed by the hardware processor, cause the hardware processor to: obtain, from a user device, a request to generate a flood footprint for a geographic area, where the geographic area comprises a first body of water; determine one or more water surface elevation values at various points along the first body of water; apply a smoothing function to the determined one or more water surface elevation values to generate one or more smoothed water surface elevation values; determine one or more locations in the geographic area that have an elevation below the one or more smoothed water surface elevation values; generate user interface data that, when rendered by the user device, causes the user device to display a user interface depicting an indication of the one or more locations that have an elevation below the one or more smoothed water surface elevation values; and transmit the user interface data to the user device.

The flood footprint estimation system of the preceding paragraph can include any sub-combination of the following features: where each of the one or more smoothed water surface elevation values corresponds to a pixel in an image depicting the geographic area; where the computer-executable instructions, when executed, further cause the hardware processor to: for a first pixel in the image corresponding to a first smoothed water surface elevation value in the one or more smoothed water surface elevation values, identify a second pixel in the image that borders the first pixel, determine a land elevation value of land represented by the second pixel using topography data, compare the land elevation value to the first smoothed water surface elevation value, and determine that the land represented by the second pixel is below the first smoothed water surface elevation in response to a determination that the land elevation value is less than the first smoothed water surface elevation value; where the computer-executable instructions, when executed, further cause the hardware processor to: for the second pixel, identify a third pixel in the image that borders the second pixel, determine a second land elevation value of land represented by the third pixel using topography data, compare the second land elevation value to the first smoothed water surface elevation value, determine that the land represented by the third pixel is above the first smoothed water surface elevation in response to a determination that the second land elevation value is greater than the first smoothed water surface elevation value, and refrain from analyzing any pixels in the image that border the third pixel and that are farther than the third pixel from the first pixel in association with the first body of water; where the geographic area comprises a second body of water, and where the computer-executable instructions, when executed, further cause the hardware processor to: determine one or more second water surface elevation values at various points along the second body of water, apply the smoothing function to the determined one or more second water surface elevation values to generate one or more smoothed second water surface elevation values, and determine one or more second locations in the geographic area that have an elevation below the one or more smoothed second water surface elevation values, where the user interface depicts an indication of the one or more second locations that have an elevation below the one or more smoothed second water surface elevation values; where the computer-executable instructions, when executed, further cause the hardware processor to: sort the determined one or more water surface elevation values such that a first water surface elevation value in the sorted one or more water surface elevation values corresponds to a point along the body of water closest to a source of the body of water and a last water surface elevation value in the sorted one or more water surface elevation values corresponds to a point along the body of water closest to a mouth of the body of water, and apply the smoothing function to the sorted one or more water surface elevation values; where each water surface elevation value in the one or more smoothed water surface elevation values has a value that is no greater than a value of a water surface elevation value previous to the respective water surface elevation value in the one or more smoothed water surface elevation values; where the user interface depicts an image representing the geographic area, where a pixel in the image is colored a first color to indicate the one or more locations that have an elevation below the one or more smoothed water surface elevation values; where the request comprises an indication of whether the flood footprint should be generated based on one of current conditions, historical conditions, or future conditions; and where the computer-executable instructions, when executed, further cause the hardware processor to one of determine the one or more water surface elevation values based on one or more cross-sectional areas or obtain the one or more water surface elevation values from an external source.

Another aspect of the disclosure provides a computer-implemented method for generating a flood footprint. The computer-implemented method further comprises: as implemented by one or more computing devices configured with specific computer-executable instructions, obtaining, from a user device, a request to generate a flood footprint for a geographic area, where the geographic area comprises a first body of water; determining one or more water surface elevation values at various points along the first body of water; applying a smoothing function to the determined one or more water surface elevation values to generate one or more smoothed water surface elevation values; determining one or more locations in the geographic area that have an elevation below the one or more smoothed water surface elevation values; generating user interface data that, when rendered by the user device, causes the user device to display a user interface depicting an indication of the one or more locations that have an elevation below the one or more smoothed water surface elevation values; and transmitting the user interface data to the user device.

The computer-implemented method of the preceding paragraph can include any sub-combination of the following features: where each of the one or more smoothed water surface elevation values corresponds to a pixel in an image depicting the geographic area; where determining one or more locations in the geographic area further comprises: for a first pixel in the image corresponding to a first smoothed water surface elevation value in the one or more smoothed water surface elevation values, identifying a second pixel in the image that borders the first pixel, determining a land elevation value of land represented by the second pixel using topography data, comparing the land elevation value to the first smoothed water surface elevation value, and determining that the land represented by the second pixel is below the first smoothed water surface elevation in response to a determination that the land elevation value is less than the first smoothed water surface elevation value; where determining one or more locations in the geographic area further comprises: for the second pixel, identifying a third pixel in the image that borders the second pixel, determining a second land elevation value of land represented by the third pixel using topography data, comparing the second land elevation value to the first smoothed water surface elevation value, determining that the land represented by the third pixel is above the first smoothed water surface elevation in response to a determination that the second land elevation value is greater than the first smoothed water surface elevation value, and refraining from analyzing any pixels in the image that border the third pixel and that are farther than the third pixel from the first pixel in association with the first body of water; where the computer-implemented method further comprises: determining one or more second water surface elevation values at various points along the second body of water, applying the smoothing function to the determined one or more second water surface elevation values to generate one or more smoothed second water surface elevation values, and determining one or more second locations in the geographic area that have an elevation below the one or more smoothed second water surface elevation values, where the user interface depicts an indication of the one or more second locations that have an elevation below the one or more smoothed second water surface elevation values; where applying a smoothing function further comprises: sorting the determined one or more water surface elevation values such that a first water surface elevation value in the sorted one or more water surface elevation values corresponds to a point along the body of water closest to a source of the body of water and a last water surface elevation value in the sorted one or more water surface elevation values corresponds to a point along the body of water closest to a mouth of the body of water, and applying the smoothing function to the sorted one or more water surface elevation values; where each water surface elevation value in the one or more smoothed water surface elevation values has a value that is no greater than a value of a water surface elevation value previous to the respective water surface elevation value in the one or more smoothed water surface elevation values; and where the user interface depicts an image representing the geographic area, where a pixel in the image is colored a first color to indicate the one or more locations that have an elevation below the one or more smoothed water surface elevation values.

Another aspect of the disclosure provides non-transitory, computer-readable storage media comprising computer-executable instructions for generating a flood footprint, where the computer-executable instructions, when executed by a computer system, cause the computer system to: obtain, from a user device, a request to generate a flood footprint for a geographic area, where the geographic area comprises a first body of water; determine one or more water surface elevation values at various points along the first body of water; apply a smoothing function to the determined one or more water surface elevation values to generate one or more smoothed water surface elevation values; determine one or more locations in the geographic area that have an elevation below the one or more smoothed water surface elevation values; generate user interface data that, when rendered by the user device, causes the user device to display a user interface depicting an indication of the one or more locations that have an elevation below the one or more smoothed water surface elevation values; and transmit the user interface data to the user device.

The non-transitory, computer-readable storage media of the preceding paragraph can include any sub-combination of the following features: each of the one or more smoothed water surface elevation values corresponds to a pixel in an image depicting the geographic area, and where the computer-executable instructions further cause the computer system to: for a first pixel in the image corresponding to a first smoothed water surface elevation value in the one or more smoothed water surface elevation values, identify a second pixel in the image that borders the first pixel, determine a land elevation value of land represented by the second pixel using topography data, compare the land elevation value to the first smoothed water surface elevation value, and determine that the land represented by the second pixel is below the first smoothed water surface elevation in response to a determination that the land elevation value is less than the first smoothed water surface elevation value.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 4 illustrates an example user interface depicting the expansion of water relative to a stream or river for determining land that may be submerged or underwater during a flood event.

DETAILED DESCRIPTION OF SPECIFIC EMBODIMENTS

Figure 1:
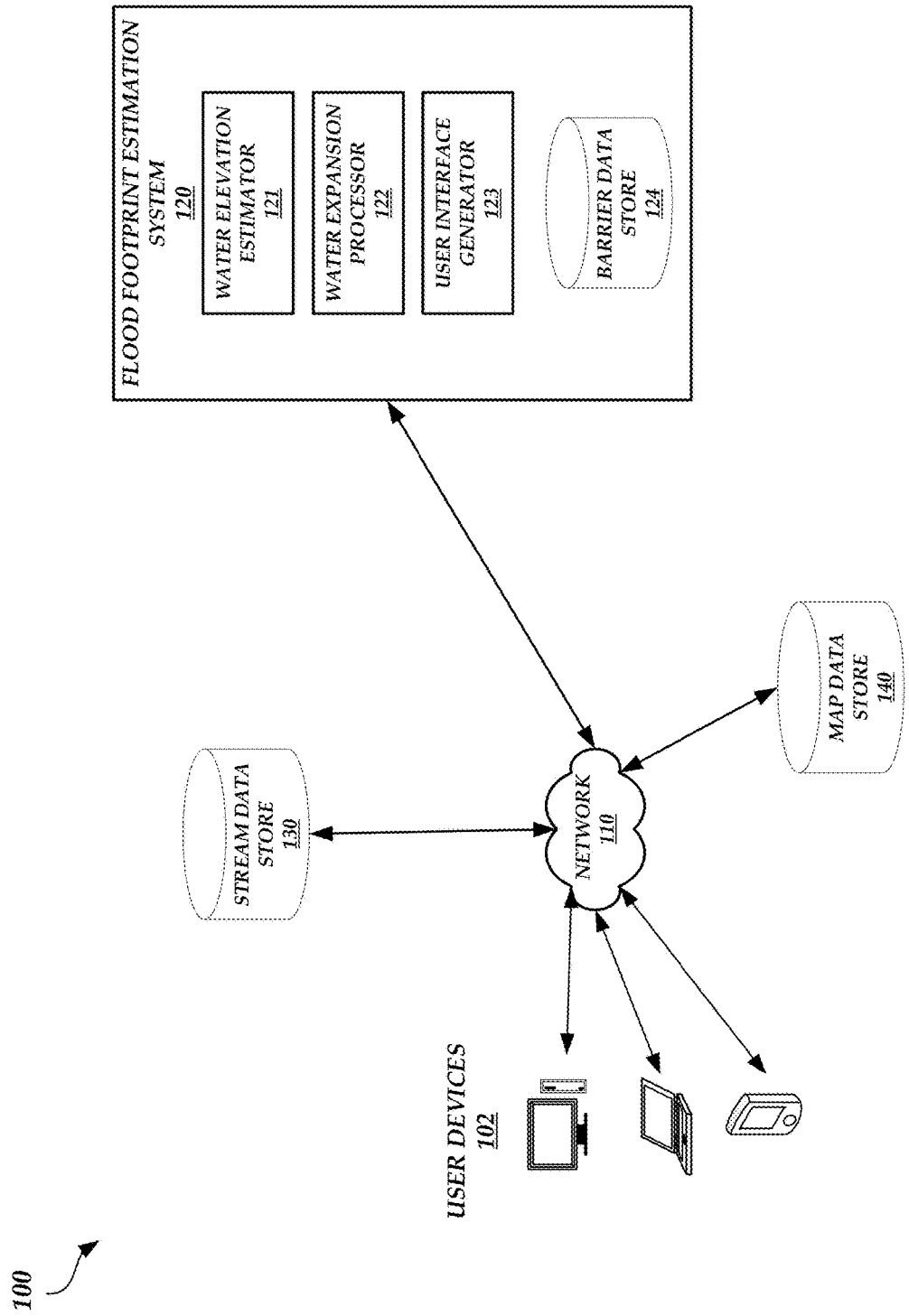
FIG. 1 is a block diagram of an illustrative operating environment in which a flood footprint estimation system uses geographic data, stream flow data, velocity data, water depth measurements, and/or the like to estimate or predict the water surface elevation of a stream or river and the land around the stream or river that may be subject to flooding.

As described above, conventional algorithms used by computing systems to predict when and where hazards may occur can be inaccurate and/or computationally expensive to run. For example, floods can cause structural damage and/or loss of life. It may be important to determine flood levels over a wide geographic area using available data (e.g., river gauge heights, flood reports, high water marks, etc.) in a timely manner to mitigate any damage or loss of life during such events. Determining flood levels from conventional vectorized streamflow algorithms can be problematic because such algorithms have significant accuracy issues and cannot ingest certain available data (e.g., river gauge heights and flood report data) to improve accuracy. Determining flood levels from conventional hydrologic and/or hydraulic models can be problematic because such models can be computationally expensive to run and are generally accurate in localized geographic areas.

As an illustrative example, some conventional computing systems use a particular type of vectorized streamflow algorithm referred to herein as a "cross-section interpolation algorithm" to predict when and where a flood may occur with respect to a stream or river. In particular, a conventional computing system executing the cross-section interpolation algorithm selects various points along the stream or river and, for each selected point, creates a cross-section of the stream or river at the respective point that extends away from the respective point in two opposing directions (e.g., North of the stream and South of the stream). Each cross-section may therefore have a width that traverses the stream or river. Along the width of a cross-section, the cross-section may also include various water depth values at different points that each represent an elevation of a bottom of the stream or river (or the ground if the point is outside the stream or river) at the respective point. The width and the various water depth values may then form an enclosed cross-sectional area, with the height between the water depth values and the top of the enclosed cross-sectional area (e.g., the water surface elevation) being unknown. The computing system may obtain stream flow values for the stream or river (e.g., the volume of water that passes through a point during a time unit, which, for example, can be expressed in cubic feet per second) and/or velocity values for the stream or river (e.g., the speed at which water is flowing in the stream or river). For each cross-section, the computing system can use the obtained data and the cross-sectional area of the respective cross-section to estimate a water surface elevation at the point along the river corresponding to the respective cross-section. Thus, the computing system can estimate the water surface elevation at cross-sections located at various points along the stream or river. The computing system can further interpolate the water surface elevation estimated at one cross-section with the water surface elevation estimated at the following cross-section to estimate a water surface elevation at areas between the two cross-sections, repeating this operation for each pair of adjacent cross-sections. The estimated and interpolated water surface elevations can then be compared with the elevation of land falling within a cross-section or between cross-sections to determine whether the water surface elevation is higher than the land elevation (e.g., indicating that flooding may occur) or lower than the land elevation (e.g., indicating that flooding may not occur).

Generally, each cross-section is oriented such that the cross section intersects the stream or river at or nearly at a 90 degree angle. Streams and rivers are usually not straight, however. Rather, streams and rivers can wind in s-shape or other patterns. In some cases, the cross-sections may have a large enough width such that one cross-section actually intersects or overlaps another cross-section given the shape of the stream or river. Given the variance in stream flow, water velocity, and/or water depths measured at different locations along a river, the water surface elevation estimated for a first cross-section may be different than the water surface elevation estimated at another cross-section that overlaps the first cross-section. For example, the estimates can be off by 3-5 feet, if not more. Thus, the water surface elevation estimated at one or both of the cross-sections may be inaccurate. This inaccuracy may be propagated when generating interpolations using one or both of the cross-section to estimate the water surface elevation at other points along the stream or river that do not correspond to a cross-section. Thus, the interpolation may produce noisy, inaccurate water surface elevation estimates at these points as well.

In addition, the cross-section interpolation algorithm fails to take into account water backup that may occur in tributaries or other streams or rivers that feed that subject stream or river. For example, when a stream or river floods, this often causes water to backup in other streams or rivers that feed the flooded stream or river. As a result, the feeding streams or rivers also tend to flood. Taking cross-sections along a stream or river, estimating water surface elevations at the cross-sections, and interpolating the estimates may provide an indication of areas within the cross-section that may flood given the estimated water surface elevations. However, execution of these operations provides no indication as to which streams or river feeding the subject stream or river may experience water backup or how such water backup may affect the likelihood of flooding to occur adjacent to the feeding streams or rivers.

As another example, other conventional computing systems use another type of vectorized streamflow algorithm referred to herein as the Height Above the Nearest Drainage or "HAND algorithm" to predict when and where a flood may occur with respect to a stream or river. In particular, a conventional computing system executing the HAND algorithm can obtain geographic data that indicates the elevation at different locations in a geographic area, estimate a water surface elevation at one point along the stream or river (e.g., using stream flow and/or velocity data), and assign different geographic locations to a particular stream or river. The conventional computing system then traces a route from a geographic location to the assigned stream or river, where the route follows the geographical topography and represents a lowest elevation path between the geographic location and the assigned stream or river. The conventional computing system can then determine a difference between the water surface elevation of the stream or river and the elevations along the route to the geographic location. If a flood footprint is requested for a water surface elevation that is X feet above the estimated water surface elevation, then the conventional computing system can identify which points along the route have an elevation below the estimated water surface elevation plus X.

The HAND algorithm, however, has several deficiencies. For example, the HAND algorithm assigns a geographic location to a single stream or river. In reality, however, multiple streams or rivers could affect whether a particular geographic location floods and/or another, unassigned stream or river might be the one that affects whether a particular geographic location floods. As explained above, one stream or river could also affect the flooding potential of another stream or river due to water backup. The HAND algorithm therefore fails to identify all possible flood locations and/or situations in which another stream or river may backup. Whether execution of the HAND algorithm indicates that a particular geographic location may flood is also dependent on the tracing algorithm used by the HAND algorithm. If the tracing algorithm generates a route that would not be followed by water during an actual flooding event, then the output produced by the HAND algorithm may be inaccurate. In some cases, a geographic location may be protected from flooding by one stream or river by a natural or artificial barrier, such as a levee, sea wall, dam, hill, and/or the like. The HAND algorithm, however, may assign that geographic location to another stream or river. Thus, the tracing algorithm may generate a route from the geographic location to the incorrectly assigned stream or river that avoids the natural or artificial barrier. The HAND algorithm output may therefore be inaccurate. In other cases, the topography data may be missing some data with respect to the natural or artificial barrier. As a result, the tracing algorithm may incorrectly generate a route from the geographic location to an assigned stream or river through the natural or artificial barrier. Finally, the HAND algorithm estimates the water surface elevation at a single point along a stream or river. The water surface elevation of the stream or river may vary, however, and therefore the output of the HAND algorithm may not take into account this variance when indicating which geographic locations may flood.

One approach for overcoming the technical deficiencies of the cross-section interpolation algorithm and the HAND algorithm is to use a hydrologic, hydraulic, or other physics-based model. A conventional computing system that uses a physics-based model may take into account water surface elevation, land elevation, land use (e.g., natural or artificial objects that may affect the speed at which water flows, such as land topography, buildings, the presence of trees or shrubs, the presence of rocks or stones, the types of rocks or stones that are present, etc.), whether the location is an urban area, and/or the like to determine where and when a flood may occur. Executing a physics-based model, however, is computationally very expensive. The computing resources (e.g., central processing unit (CPU) and graphics processing power, available memory capacity, memory speed, network bandwidth, bus speed, etc.) needed to run the model may be difficult to obtain. Even if such computing resources are available to a computing system, it may take the computing system a long period of time to produce an output. Because of the large amount of computing resources involved in executing a physics-based model and the computing limitations of a computing system that executes the model, the model itself may cover a narrow geographic area rather than a wide geographic area to limit the number of operations to execute and/or data to process.

Accordingly, described herein is a flood footprint estimation system that runs operations that can overcome the technical deficiencies of the cross-section interpolation algorithm and the HAND algorithm without involving the amount of computing resources generally used to run the hydraulic or physics-based model. For example, the flood footprint estimation system can estimate water surface elevations at various points along a stream or river. Conservation of mass indicates that the water surface elevation at a point along a stream or river closer to the mouth of the stream or river cannot be greater than the water surface elevation at a point along a stream or river closer to the source of the stream or river. The estimated water surface elevations, however, may not follow the conservation of mass due to inaccuracies in actual measurements or other data used to generate the water surface elevation estimates. Thus, the flood footprint estimation system can sort or order the estimated water surface elevations such that the estimated water surface elevation corresponding to a point along the stream or river closest to the source of the stream or river is ordered first, the estimated water surface elevation corresponding to a point along the stream or river that is second closest to the source of the stream or river is ordered second, and so on until the estimated water surface elevation corresponding to a point along the stream or river closest to the mouth of the stream or river is ordered last. The flood footprint estimation system can then perform a smoothing operation on the ordered estimated water surface elevations to generate a trend line or curve of the estimated water surface elevations in which each point of the trend line or curve corresponds to a water surface elevation value that is no greater than any of the water surface elevation values of the previous points of the trend line or curve. Thus, the trend line or curve may comply with the conservation of mass and may lead to more accurate outputs by the flood footprint estimation system.

Once the trend line or curve is generated, the flood footprint estimation system can perform an iterative water expansion to determine which geographic locations may flood given the estimated water surface elevations and/or given water surface elevations that exceed the estimated water surface elevations by a threshold value or percentage. For example, the trend line or curve may indicate an estimated water surface elevation at a center of the stream or river (e.g., at a location in the stream or river that is equidistant or nearly equidistant between the two banks of the stream or river) for a unit of measure (e.g., meter, centimeter, millimeter, inch, foot, etc.) along the stream or river. In other words, if a pixel in an image depicting the stream or river corresponds to the unit of measure, then there may be a set of pixels in the image that each represent the center of the stream or river at various points along the stream or river. The trend line or curve may then indicate an estimated water surface elevation for each of these center pixels. For each pixel in the image that borders a center pixel, the flood footprint estimation system can determine whether an elevation of land represented by the respective pixel is above or below the estimated water surface elevation of the center pixel as indicated by the trend line or curve and/or above or below the estimated water surface elevation of the center pixel as indicated by the trend line or curve plus a threshold value or percentage. If the flood footprint estimation system determines that the respective pixel represents land having an elevation below the estimated water surface elevation as indicated by the trend line or curve and/or below the estimated water surface elevation as indicated by the trend line or curve plus a threshold value or percentage, then the flood footprint estimation system may mark or annotate the respective pixel as being underwater. If a pixel is marked or annotated as being underwater, this may indicate that another pixel bordering the underwater pixel may correspond to land that may also be underwater. Thus, the flood footprint estimation system can then iterate to the pixel(s) bordering the underwater pixel and repeat the same analysis. If the flood footprint estimation system determines that the respective pixel represents land having an elevation above the estimated water surface elevation as indicated by the trend line or curve and/or above the estimated water surface elevation as indicated by the trend line or curve plus a threshold value or percentage, then the flood footprint estimation system may not mark or annotate the respective pixel. If the respective pixel is not marked or annotated as being underwater (e.g., the flood footprint estimation system determines that the land corresponding to the respective pixel is above water), then the flood footprint estimation system may not analyze any pixels bordering the respective pixel that are farther than the respective pixel from the stream or river (e.g., from the center pixel(s) representing the stream or river) given that these pixels likely correspond to land that is above water as well. Thus, the flood footprint estimation system can repeat these water expansion operations until the edge of the image is reached and/or until all pixels that border underwater pixels are determined to be above water.

The flood footprint estimation system can repeat this iterative water expansion for any number of streams or rivers within a geographic area. Thus, while the iterative water expansion performed for one stream or river may indicate that a geographic location would be above water, the iterative water expansion performed for another stream or river may indicate that this geographic location is actually underwater. Accordingly, the accuracy of the flood footprint estimation system does not rely on geographic locations being assigned to the correct stream or river or a particular route traced between a geographic location and the stream or river. Rather, the flood footprint estimation system can more accurately identify whether a geographic location may be above water or underwater by not assigning geographic locations to particular streams or rivers and by repeating the iterative water expansion operations for any number of streams or rivers.

In addition, the flood footprint estimation system may perform the iterative water expansion irrespective of whether a pixel being analyzed corresponds to land, a structure, or another stream or river. Thus, in some cases, the flood footprint estimation system may determine that a pixel adjacent to a pixel corresponding to another stream or river that normally would be above water is actually underwater. In this way, the iterative water expansion can capture naturally situations in which water backup occurs.

Furthermore, generating the trend line or curve and using the water surface elevation values from the trend line or curve to perform the iterative water expansion may ensure that inaccuracies that occur from interpolation or overlapping cross-sections are not present. For example, inaccuracies that occur from interpolation may not be present with the iterative water expansion because the trend line or curve ensures compliance with conservation of mass, which reduces inaccuracies associated with water surface elevation estimates. In addition, inaccuracies that occur from overlapping cross-sections may not be present with the iterative water expansion because the iterative water expansion does not use cross-sections to identify land that may be underwater, and therefore a situation in which two different elevations are associated with the same pixel is avoided.

Finally, the flood footprint estimation system can produce the outputs described herein using similar inputs as the cross-section interpolation algorithm and/or the HAND algorithm, where these inputs may not be as numerous as the ones used by the hydraulic and/or physics-based model. Thus, the flood footprint estimation system may be more accurate than these algorithms without using the amount of computing resources involved with executing the hydraulic and/or physics-based model.

The flood footprint estimation system can interact with user devices over a network and, based on requests submitted by user devices, can indicate real-time flood conditions (e.g., flood conditions at a current time, such as within a minute of when the request was submitted, within 10 minutes of when the request was submitted, within 30 minutes of when the request was submitted, within 1 hour of when the request was submitted, etc.), can indicate historical flood conditions (e.g., using historical stream flow, velocity, and/or water surface elevation data), and/or can predict future flood conditions (e.g., using hypothetical data, such as hypothetical stream flow, velocity, and/or water surface elevation data).

While the present disclosure describes the flood footprint estimation system as estimating or predicting flood conditions in association with a stream or river, this is not meant to be limiting. The flood footprint estimation system can use the same or similar techniques to estimate or predict flood conditions in association with any natural or artificial body of water, such as a stream, a river, a canal, a lake, an ocean, a bay, a harbor, a lock, a pond, an aqueduct, a moat, a ditch, a drain, and/or the like.

The foregoing aspects and many of the attendant advantages of this disclosure will become more readily appreciated as the same become better understood by reference to the following detailed description, when taken in conjunction with the accompanying drawings.

Example Flood Footprint Estimation Environment

FIG. 1 is a block diagram of an illustrative operating environment 100 in which a flood footprint estimation system 120 uses geographic data, stream flow data, velocity data, water depth measurements, and/or the like to estimate or predict the water surface elevation of a stream or river and the land around the stream or river that may be subject to flooding. The operating environment 100 further includes a stream data store 130 and a map data store 140 that may each communicate with the flood footprint estimation system 120 via a network 110 to provide the geographic data, the stream flow data, the velocity data, the water depth measurements, and/or the like. Furthermore, the operating environment 100 includes various user devices 102 that may communicate with the flood footprint estimation system 120 to request real-time flood conditions, to request historical flood conditions, and/or to request a prediction on future flood conditions.

The flood footprint estimation system 120 can be a computing system having memory storing computer-executable instructions and one or more hardware processors in communication with the memory, where the computer-executable instructions, when executed by the one or more hardware processors, cause the hardware processor(s) to estimate or predict the water surface elevation of a stream or river and the land around the stream or river that may be subject to flooding. The flood footprint estimation system 120 may be a single computing device, or it may include multiple distinct computing devices, such as computer servers, logically or physically grouped together to collectively operate as a server system. The components of the flood footprint estimation system 120 can each be implemented in application-specific hardware (e.g., a server computing device with one or more ASICs) such that no software is necessary, or as a combination of hardware and software. In addition, the modules and components of the flood footprint estimation system 120 can be combined on one server computing device or separated individually or into groups on several server computing devices. In some embodiments, the flood footprint estimation system 120 may include additional or fewer components than illustrated in FIG. 1.

In some embodiments, the features and services provided by the flood footprint estimation system 120 may be implemented as web services consumable via the communication network 110. In further embodiments, the flood footprint estimation system 120 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The flood footprint estimation system 120 may include various modules, components, data stores, and/or the like to provide the flood estimation and prediction functionality described herein. For example, the flood footprint estimation system 120 may include a water elevation estimator 121, a water expansion processor 122, a user interface generator 123, and a barrier data store 124.

The water elevation estimator 121 can estimate the water surface elevation at various points along a stream or river. For example, a user device 102 may submit to the flood footprint estimation system 120 a request for real-time flood conditions, historical flood conditions, or future flood conditions associated with a stream or river and/or a geographic area. In response, the water elevation estimator 121 can obtain from the stream data store 130 stream flow data (e.g., data indicating the volume of water that passes through a location during a unit of time), velocity data (e.g., data indicating a speed at which water passes through a location), and/or water depth values (e.g., values indicating an elevation at a location at a bottom of a stream or river) associated with the requested stream or river and/or associated with the stream(s) and/or river(s) within the requested geographic area. The water elevation estimator 121 can also obtain geographical data from the map data store 140. The geographical data can include topography data that indicates the elevation of land surrounding the requested stream or river and/or within the requested geographic area and/or an image depicting the land surrounding and including the requested stream or river and/or the requested geographic area (where the topography data may be mapped to the image such that the elevation of land represented by a pixel in the image is mapped to the pixel, thereby allowing the flood footprint estimation system 120 to determine the land elevation of land represented by a pixel).

The water elevation estimator 121 can then use the obtained data to estimate the water surface elevations. For example, for a particular point along a stream or river that was requested or that resides within the requested geographic area, the water elevation estimator 121 can create a cross-sectional area bounded by a chosen width that traverses the stream or river (e.g., that is perpendicular or nearly perpendicular to the direction in which the stream or river flows), the water depth value(s) at the respective point, and an unknown water surface elevation. Stream flow of a stream or river at a particular point may be equal to the cross-sectional area times the velocity of the water at the point. The water elevation estimator 121 can therefore use the obtained stream flow data, water depth value(s), and the velocity data to estimate the unknown water surface elevation for the respective point.

The water elevation estimator 121 can provide the estimated water surface elevations to the water expansion processor 122. The water expansion processor 122 can sort or order the estimated water surface elevations such that the estimated water surface elevation corresponding to a point along the stream or river closest to the source of the stream or river is ordered first, the estimated water surface elevation corresponding to a point along the stream or river that is second closest to the source of the stream or river is ordered second, and so on until the estimated water surface elevation corresponding to a point along the stream or river closest to the mouth of the stream or river is ordered last. The water expansion processor 122 can then perform a smoothing operation on the ordered estimated water surface elevations to generate a trend line or curve of the estimated water surface elevations in which each point of the trend line or curve corresponds to a water surface elevation value that is no greater than any of the water surface elevation values of the previous points of the trend line or curve. In other words, the trend line or curve may indicate estimated water surface elevation values that decrease when traveling in the direction of the flow of the stream or river (e.g., when moving in a direction toward the mouth of the stream or river).

The request submitted by a user device 102 may include the type of flood estimate or prediction to perform, such as whether the estimate should be based on current conditions, historical conditions (with an indication of a date or date range), or a prediction of future conditions (with an indication of a water surface elevation value less than or greater than a current water surface elevation at which to perform the prediction and/or with an indication of a percentage less than or greater than a current water surface elevation at which to perform the prediction). Once the trend line or curve is generated, the water expansion processor 122 can perform an iterative water expansion to determine which geographic locations may flood given the estimated water surface elevations and/or given water surface elevations that exceed or do not exceed the estimated water surface elevations by a threshold value or percentage (as indicated in the request submitted by the user device 102). For example, the trend line or curve may indicate an estimated water surface elevation at a center of the stream or river (e.g., at a location in the stream or river that is equidistant or nearly equidistant between the two banks of the stream or river) for a unit of measure (e.g., meter, centimeter, millimeter, inch, foot, etc.) along the stream or river. In other words, if a pixel in the obtained image depicting the stream or river corresponds to the unit of measure, then there may be a set of pixels in the image that each represent the center of the stream or river at various points along the stream or river. The trend line or curve may then indicate an estimated water surface elevation for each of these center pixels. For each pixel in the obtained image that borders a center pixel, the water expansion processor 122 can determine whether an elevation of land represented by the respective pixel (as indicated by the topography data) is above or below the estimated water surface elevation of the center pixel as indicated by the trend line or curve and/or above or below the estimated water surface elevation of the center pixel as indicated by the trend line or curve plus or minus a threshold value or percentage.

If the water expansion processor 122 determines that the respective pixel represents land having an elevation below the estimated water surface elevation as indicated by the trend line or curve and/or below the estimated water surface elevation as indicated by the trend line or curve plus or minus a threshold value or percentage, then the water expansion processor 122 may mark or annotate the respective pixel of the obtained image as being underwater. If a pixel is marked or annotated as being underwater, this may indicate that another pixel bordering the underwater pixel may correspond to land that may also be underwater. Thus, the water expansion processor 122 can then iterate to the pixel(s) bordering the underwater pixel and repeat the same analysis (e.g., determine whether the next pixel bordering the underwater pixel represents land having an elevation below the estimated water surface elevation of the center pixel used to identify that the underwater pixel is underwater and/or below the estimated water surface elevation of the center pixel used to identify that the underwater pixel is underwater plus or minus a threshold value or percentage).

If the water expansion processor 122 determines that the respective pixel represents land having an elevation above the estimated water surface elevation as indicated by the trend line or curve and/or above the estimated water surface elevation as indicated by the trend line or curve plus or minus a threshold value or percentage, then the water expansion processor 122 may not mark or annotate the respective pixel of the obtained image or may mark or annotate the respective pixel of the obtained image as being above water. If the respective pixel is not marked or annotated as being underwater (e.g., the water expansion processor 122 determines that the land corresponding to the respective pixel is above water), then the water expansion processor 122 may not analyze any pixels bordering the respective pixel that are farther than the respective pixel from the stream or river (e.g., from the center pixel(s) representing the stream or river) given that these pixels likely correspond to land that is above water as well. Thus, the water expansion processor 122 can repeat these water expansion operations until the edge of the image is reached and/or until all pixels that border underwater pixels are determined to represent land that is above water.

Alternatively, the water expansion processor 122 can perform the water surface elevation estimate and the water expansion in a combined step. For example, instead of receiving estimated water surface elevations from the water elevation estimator 121, the water expansion processor 122 can select a portion of a requested stream or river or a portion of a stream or river present within a requested geographic area. The selected portion may be an area bounded by a width traversing the stream or river (e.g., a width that is perpendicular or nearly perpendicular to a direction in which the stream or river flows), a length along the stream or river (e.g., a length that is parallel or nearly parallel to a direction in which the stream or river flows), water depth value(s) for points within an area formed by the width and length, and unknown water surface elevation values. The water expansion processor 122 can select different water surface elevation values for the section until the volume produced by the bounded area matches the volume of water that passes through the section during a unit of time as indicated by the obtained stream flow data. In particular, the water expansion processor 122 may select water surface elevations such that a water surface elevation selected for a point in the section that is closer to the mouth of the stream or river is no greater than a water surface elevation selected for a point in the section that is closer to a source of the stream or river. In other words, the water expansion processor 122 may select water surface elevations that decrease when traveling in the direction of the flow of the stream or river (e.g., when moving in a direction toward the mouth of the stream or river). The water expansion processor 122 can then use the selected water surface elevation values to determine geographic areas that are below or above the selected water surface elevation values and/or the selected water surface elevation values plus or minus a threshold value or percentage in a manner as described above.

In further embodiments, the water expansion processor 122 can use barrier data during the water expansion process. For example, the barrier data store 124 may store barrier data indicating geographic locations at which natural or artificial barriers are present, the shapes of the barriers, the elevations of the barriers, the conditions of the barriers (e.g., whether a barrier is still standing, whether a barrier has failed, etc.), and/or the like. The water expansion processor 122 can modify the topography data to include the elevation (s) of any barrier present adjacent to a requested stream or river and/or within a requested geographic area. In some embodiments, the water expansion processor 122 may modify the topography data to include the barrier elevation (s) based on the condition of the barrier as indicated by the barrier data and/or based on a condition of the barrier as indicated by the request submitted by the user device 102. If the barrier data or the request indicates that a barrier has deteriorated and/or failed or is expected to in the future, this may indicate that the barrier may not be able to prevent flooding now or in the future. Thus, the water expansion processor 122 may not modify the topography data to include the barrier elevation(s) and/or may modify the topography data to include the barrier elevation(s) for only those portions of the barrier that have not deteriorated, if any. Similarly, if the barrier data or the request indicates that a barrier is still standing, in good shape, or is otherwise capable of preventing flooding now or in the future, then the water expansion processor 122 may modify the topography data to include some or all of the barrier elevation(s). The water expansion processor 122 can then continue with the water expansion operations described herein using the possibly updated topography data. In this way, the water expansion processor 122 can take into account natural and/or artificial barriers in identifying which portions of a geographic area are flooding, have flooded in the past, and/or may flood in the future. In fact, the water expansion processor 122 can produce more accurate results (e.g., more accurate than the HAND algorithm) given that a geographic location is not assigned to a single stream or river, and therefore there is no danger that a geographic location may be assigned to the wrong stream or river and result in the effects of a barrier on flooding being disregarded.

In some cases, water flowing in a stream or river may flow over the top of a natural or artificial barrier (or any other local peak in a geographic region), such as a barrier identified by barrier data stored in the barrier data store 124. In such cases, water may start to flow downhill from the peak of the natural or artificial barrier away from the stream or river and in a direction that is perpendicular to or nearly perpendicular to (e.g., 60°, 70°, 80°, 85°, 89.5°, etc.) the waterflow of the stream or river. Because the water flowing downhill from the peak of the natural or artificial barrier may be flowing perpendicular to or nearly perpendicular to the waterflow of the stream or river, the water surface elevation of the land downhill from the peak of the natural or artificial barrier may be different than the water surface elevation of the corresponding center pixel as indicated by the trend line or curve. Rather, the water surface elevation of the land downhill from the peak of the natural or artificial barrier may be dependent on a depth of the water at the peak of the natural or artificial barrier.

Thus, the water expansion processor 122 can use the barrier data stored in the barrier data store 124 to identify pixels corresponding to land downhill from a natural or artificial barrier. In particular, the barrier data may indicate the geographic location of a peak of a natural or artificial barrier. The obtained image may include metadata or associated data that maps pixels in the obtained image to geographic locations. Alternatively or in addition, the flood footprint estimation system 120 may include a data store (not shown) that stores a mapping of image pixels to geographic locations. The water expansion processor 122 can use the mapping to identify the pixel in the obtained image corresponding to the peak of a natural or artificial barrier. If the water expansion processor 122 marks or annotates or otherwise determines that the pixel corresponding to the peak of a natural or artificial barrier is underwater in a manner as described above (e.g., determines that the pixel corresponds to land having an elevation below the estimated water surface elevation as indicated by the trend line or curve and/or below the estimated water surface elevation as indicated by the trend line or curve plus or minus a threshold value or percentage), then the water expansion processor 122 can use the barrier data and/or the mapping to identify pixels in the obtained image that correspond to land downhill from the peak of the natural or artificial barrier (e.g., identify pixels in the obtained image that are separated from one or more center pixels representing the center of the stream or river at various points by at least the pixel corresponding to the peak of the natural or artificial barrier). The water expansion processor 122 can operate as described above to determine whether a pixel corresponds to land above water or underwater. If the water expansion processor 122 determines that a pixel corresponds to land underwater and the pixel is identified as being downhill from the peak of the natural or artificial barrier, then the water expansion processor 122 may mark, annotate, or otherwise identify the estimated water surface level at the pixel (and therefore at the associated land) to be the depth of the water at the peak of the natural or artificial barrier plus an elevation of the land corresponding to the pixel.

The water expansion processor 122 can then repeat these operations for any other streams or rivers that are present in a requested geographic area or that are otherwise requested by the user device 102. The water expansion processor 122 can then provide an indication of which pixels represent land underwater and/or which pixels represent land that is above water to the user interface generator 123. The user interface generator 123 can then generate user interface data that, when rendered by a user device 102, causes the user device 102 to display a user interface depicting the obtained image modified to indicate the pixels that correspond to land that is determined to be underwater and/or to indicate the pixels that correspond to land that is determined to be above water. As an illustrative example, the user interface may include pixels colored blue to indicate land that is underwater. In some embodiments, the water expansion processor 122 can determine the difference between elevation of land corresponding to a pixel and the estimated water surface elevation as indicated by the trend line or curve and/or the estimated water surface elevation as indicated by the trend line or curve plus or minus a threshold value or percentage and provide this difference to the user interface generator 123. The shade of blue that a pixel is colored may indicate the relative depth of the land underneath the water surface elevation. For example, the water expansion processor 122 can color a pixel a darker shade of blue to indicate that the land elevation is deeper below the water surface elevation, and can color a pixel colored a lighter shade of blue to indicate that the land elevation is closer to the water surface elevation.

While the present disclosure describes the user interface generator 123 as coloring pixels to indicate whether land is above or below the water surface elevation, this is not meant to be limiting. The user interface generator 123 can also include a bounded shape to indicate pixels that correspond to land above or below the water surface elevation, textual notes to describe which portions depicted in the image are above or below the water surface elevation, can adjust the brightness, contrast, hue, etc. of pixels to indicate which pixels correspond to land above and/or below the water surface elevation, and/or the like.

As described above, the barrier data store 124 stores barrier data. While the barrier data store 124 is depicted as being located internal to the flood footprint estimation system 120, this is not meant to be limiting. For example, not shown, the barrier data store 124 can be located external to the flood footprint estimation system 120.

Similarly, the stream data store 130 can store stream flow data, velocity data, and/or water depth values for various streams or rivers. The stream data store 130 can store current values of such data and/or historical values of such data (where whether the water elevation estimator 121 and/or the water expansion processor 122 requests current values or historical values may depend on the type of request received from a user device 102). While the stream data store 130 is depicted as being located external to the flood footprint estimation system 120, this is not meant to be limiting. For example, not shown, the stream data store 130 can be located internal to the flood footprint estimation system 120.

The map data store 140 can store geographical data, such as topography data, images of geographic locations, and/or other geographical map data. While the map data store 140 is depicted as being located external to the flood footprint estimation system 120, this is not meant to be limiting. For example, not shown, the map data store 140 can be located internal to the flood footprint estimation system 120.

Example Block Diagrams for Generating a Flood Footprint

Figure 2:
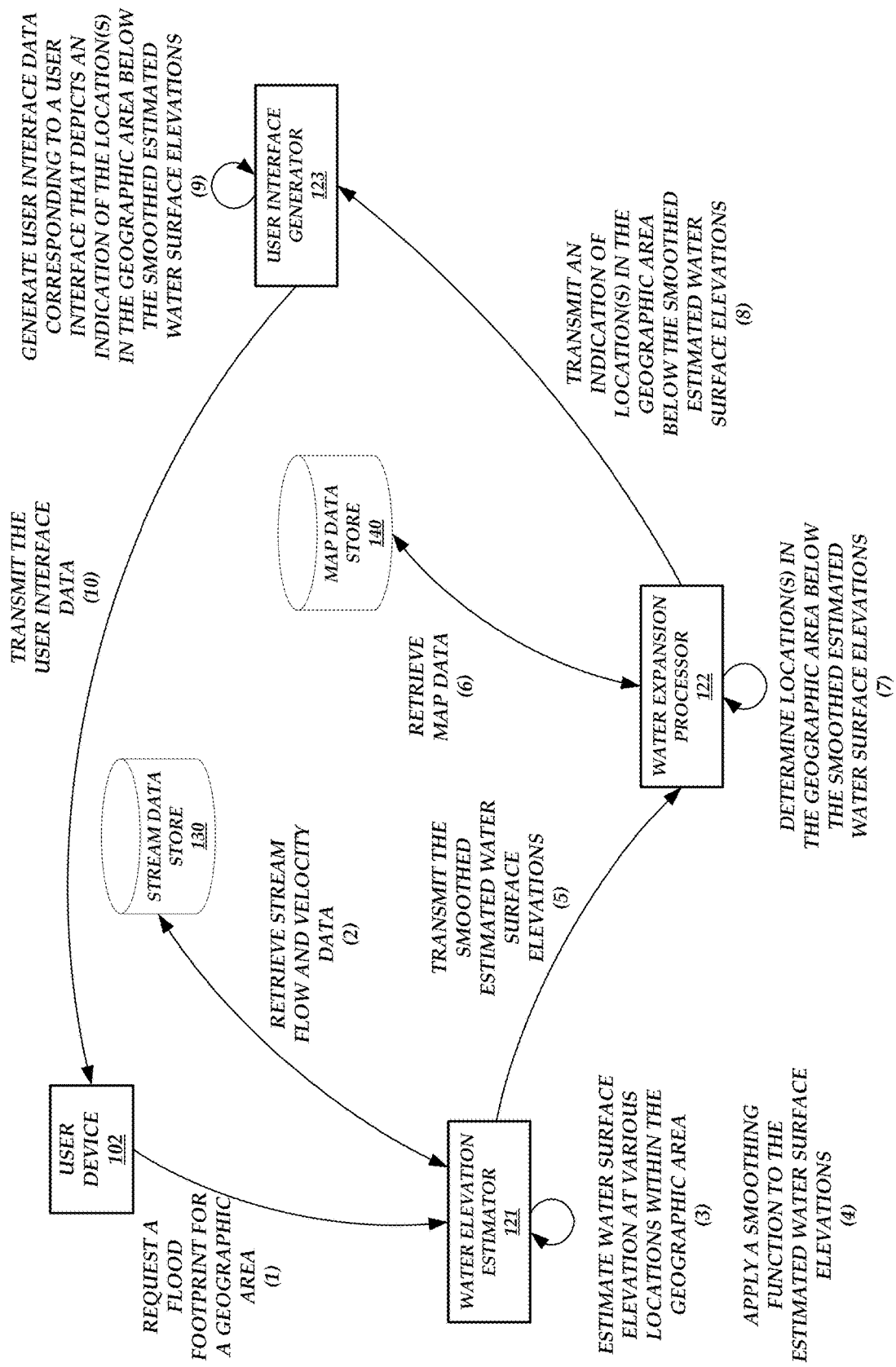
FIG. 2 is a flow diagram illustrating the operations performed by the components of the operating environment of FIG. 1 to generate a flood footprint indicating geographical areas that may flood using a water expansion process.

FIG. 2 is a flow diagram illustrating the operations performed by the components of the operating environment 100 of FIG. 1 to generate a flood footprint indicating geographical areas that may flood using a water expansion process. As illustrated in FIG. 2, a user device 102 requests a flood footprint for a geographic area from the water elevation estimator 121 at (1). The request may include an indication of the geographic area, whether the flood footprint should be based on current conditions, historical conditions, or future conditions, what the future conditions are if the flood footprint should be based on future conditions, and/or a threshold value or percentage above or below an estimated water surface elevation on which the flood footprint should be based (optionally including an indication of to which stream(s) or river(s) the threshold value or percentage applies).

The water elevation estimator 121 can retrieve stream flow and velocity data for one or more streams or rivers in the geographic area from the stream data store 130 at (2). The water elevation estimator 121 may obtain current stream flow and velocity data if the request indicates that the flood footprint should be based on current conditions. The water elevation estimator 121 may obtain historical stream flow and velocity data corresponding to a time period indicated in the request submitted by the user device 102 if the request indicates that the flood footprint should be based on historical conditions. The water elevation estimator 121 may obtain current stream flow and velocity data, historical stream flow and velocity data, or no stream flow and velocity data if the request indicates that the flood footprint should be based on future conditions (e.g., the water elevation estimator 121 may obtain current or historical data if the request indicates that the future conditions may be similar to current or historical conditions, and may obtain no data if the request includes the desired future conditions).

The water elevation estimator 121 can then estimate the water surface elevation at various locations within the geographic area at (3). For example, the water elevation estimator 121 can estimate the water surface elevations at various points along one or more streams or rivers within the geographic area using the obtained stream flow and velocity data and/or using future stream flow and velocity data included in the request.

The water elevation estimator 121 can, for each stream or river in the geographic area, apply a smoothing function to the estimated water surface elevations for the respective stream or river at (4), and transmit the smoothed estimated water surface elevations to the water expansion processor 122 at (5). Optionally, the water elevation estimator 121 may order the estimated water surface elevation values for the respective stream or river from water surface elevation values estimated at a location closer to the source of the respective stream or river to water surface elevation values estimated at a location closer to the mouth of the respective stream or river prior to applying the smoothing function.

Alternatively, the water elevation estimator 121 transmits the estimated water surface elevations to the water expansion processor 122. The water expansion processor 122 can then, for each stream or river in the geographic area, optionally order the estimated water surface elevation values for the respective stream or river and apply the smoothing function.

The water expansion processor 122 can retrieve map data from the map data store 140 at (6). The map data can include the topography data for the geographic area and/or one or more images depicting the geographic area. The water expansion processor 122 can then, for each stream or river in the geographic area, use the smoothed estimated water surface elevation values and the map data to determine location(s) in the geographic area that are below the smoothed estimated water surface elevations (optionally plus or minus the threshold value or percentage indicated in the request) at (7). For example, the water expansion processor 122 can use the water expansion process described herein to make the determination. Once determined, the water expansion processor 122 can transmit to the user interface generator 123 an indication of the location(s) in the geographic area that are below the smoothed estimated water surface elevations (optionally plus or minus the threshold value or percentage indicated in the request) at (8).

The user interface generator 123 can generate user interface data corresponding to a user interface that depicts an indication of the location(s) in the geographic area that are below the smoothed estimated water surface elevations (optionally plus or minus the threshold value or percentage indicated in the request) at (9). The user interface generator 123 can then transmit the user interface data to the user device 102 at (10) to fulfill the request. The user device data, when rendered by the user device 102, may cause the user device 102 to display the user interface.

Figure 3:
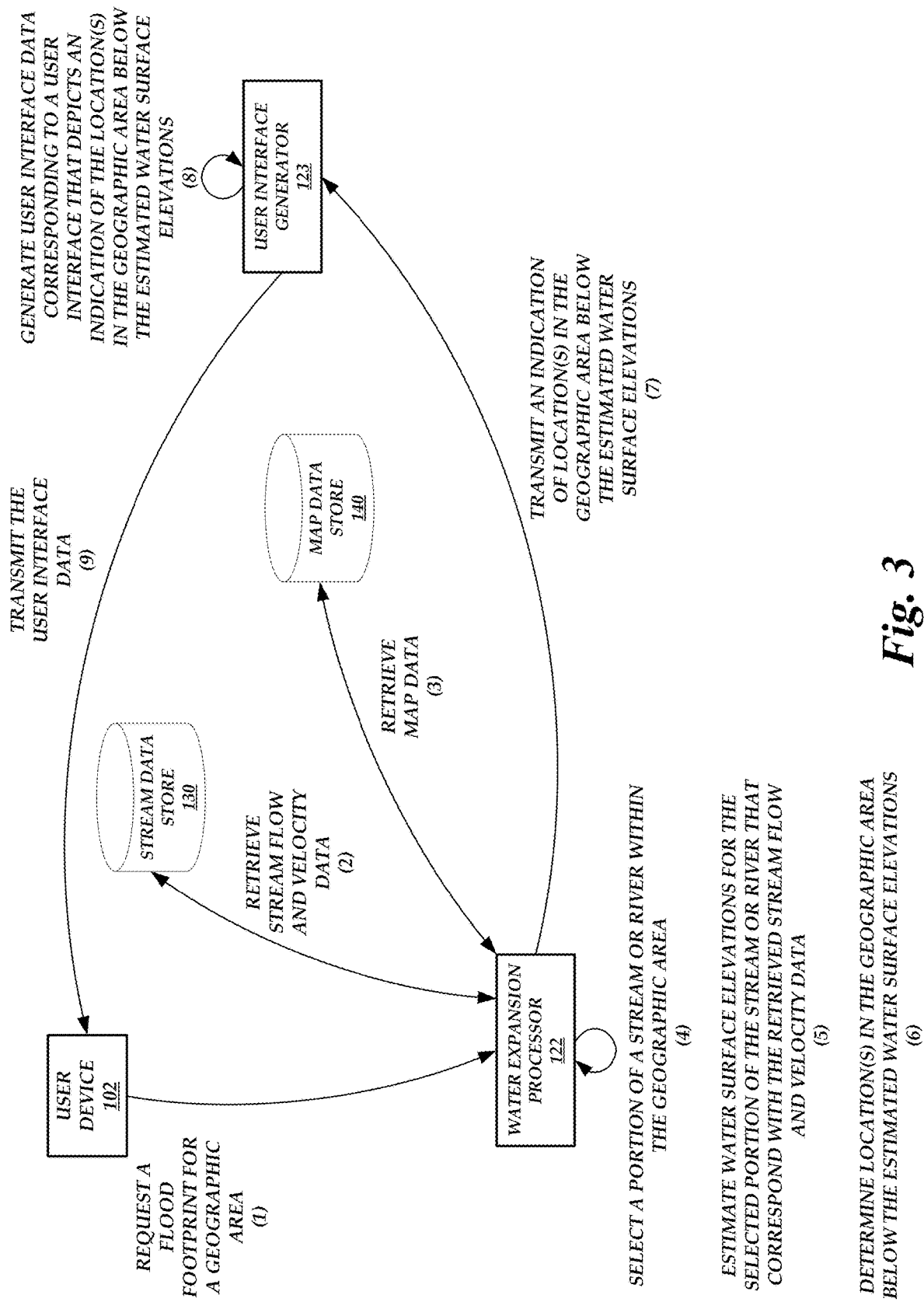
FIG. 3 is another flow diagram illustrating the operations performed by the components of the operating environment of FIG. 1 to generate a flood footprint indicating geographical areas that may flood using a water expansion process.

FIG. 3 is another flow diagram illustrating the operations performed by the components of the operating environment 100 of FIG. 1 to generate a flood footprint indicating geographical areas that may flood using a water expansion process. As illustrated in FIG. 3, a user device 102 requests a flood footprint for a geographic area from the water expansion processor 122 at (1). The request may include an indication of the geographic area, whether the flood footprint should be based on current conditions, historical conditions, or future conditions, what the future conditions are if the flood footprint should be based on future conditions, and/or a threshold value or percentage above or below an estimated water surface elevation on which the flood footprint should be based (optionally including an indication of to which stream(s) or river(s) the threshold value or percentage applies).

The water expansion processor 122 can retrieve stream flow and velocity data for one or more streams or rivers in the geographic area from the stream data store 130 at (2). The water expansion processor 122 may obtain current stream flow and velocity data if the request indicates that the flood footprint should be based on current conditions. The water expansion processor 122 may obtain historical stream flow and velocity data corresponding to a time period indicated in the request submitted by the user device 102 if the request indicates that the flood footprint should be based on historical conditions. The water expansion processor 122 may obtain current stream flow and velocity data, historical stream flow and velocity data, or no stream flow and velocity data if the request indicates that the flood footprint should be based on future conditions (e.g., the water expansion processor 122 may obtain current or historical data if the request indicates that the future conditions may be similar to current or historical conditions, and may obtain no data if the request includes the desired future conditions).

The water expansion processor 122 can also retrieve map data from the map data store 140 at (3). The map data can include the topography data for the geographic area and/or one or more images depicting the geographic area.

The water expansion processor 122 can then, for each stream or river in the geographic area, select a portion of the respective stream or river at (4), estimate water surface elevations for the selected portion of the stream or river that correspond with the retrieved stream flow and/or velocity data at (5), and determine location(s) within the geographic area that are below the estimated water surface elevations for the selected portion of the stream or river at (6). For example, the water expansion processor 122 can, for a stream or river in the geographic area, select water surface elevations that generally decrease in the direction of flow of the stream or river and that cause a volume of a bounded region created by the section to match a volume of water passing through the section as indicated by the stream flow data retrieved from the stream data store 130 and/or provided by the user device 102. The water expansion processor 122 can then transmit to the user interface generator 123 an indication of the location(s) in the geographic area below the estimated water surface elevations at (7).

The user interface generator 123 can generate user interface data corresponding to a user interface that depicts an indication of the location(s) in the geographic area that are below the smoothed estimated water surface elevations (optionally plus or minus the threshold value or percentage indicated in the request) at (8). The user interface generator 123 can then transmit the user interface data to the user device 102 at (9) to fulfill the request. The user device data, when rendered by the user device 102, may cause the user device 102 to display the user interface.

Example User Interfaces

FIG. 4 illustrates an example user interface 400 depicting the expansion of water relative to a stream or river for determining land that may be submerged or underwater during a flood event. The user interface 400 may be rendered and displayed by a user device 102 in response to the user device 102 processing user interface data generated by the user interface generator 123.

As illustrated in FIG. 4, the user interface 400 includes a pane 410 depicting a river 420, a stream 430 that flows into the river 420, and a barrier 440. For ease of explanation, water in the river 420 may generally flow from a left portion of the pane 410 toward a right portion of the pane 410. Similarly, water in the stream 430 may generally flow from a left portion of the pane 410 toward a right portion of the pane 410.

As explained herein, the flood footprint estimation system 120 can estimate water surface elevations of the river 420 at various points along the river 420. Alternatively, the flood footprint estimation system 120 can obtain estimated water surface elevations of the river 420 at various points along the river 420 from an external source. Once determined or obtained, the flood footprint estimation system 120 can apply a smoothing function to the estimated water surface elevations and then compare land elevations at pixels outside the river 420 to the smoothed estimated water surface elevations, performing the comparison iteratively from pixels closer to the river 420 to pixels farther from the river 420, as indicated by the arrows. If the comparison results in a determination that the land elevation corresponding to a pixel is less than the smoothed estimated water surface elevations (optionally plus or minus a threshold value or percentage), then the flood footprint estimation system 120 can mark the pixel accordingly, and a representation of this determination may appear in the user interface 400.

Before, during, and/or after estimating or obtaining the water surface elevations at points along the river 420, smoothing the estimated water surface elevation values, and comparing the smoothed estimated water surface elevation values to the land elevations, the flood footprint estimation system 120 can also perform the same actions with respect to the stream 430. If the flood footprint estimation system 120 determines, based on the comparison performed with respect to the river 420, that a first pixel represents land that is underwater and determines, based on the comparison performed with respect to the stream 430, that the first pixel represents land that is above water, then the flood footprint estimation system 120 may determine that the first pixel represents land that is underwater. Similarly, if the flood footprint estimation system 120 determines, based on the comparison performed with respect to the river 420, that a first pixel represents land that is above water and determines, based on the comparison performed with respect to the stream 430, that the first pixel represents land that is underwater, then the flood footprint estimation system 120 may determine that the first pixel represents land that is underwater. In other words, if a conflict arises based on comparisons performed with respect to different bodies of water, then the flood footprint estimation system 120 may default to determining that the corresponding pixel is underwater.

The flood footprint estimation system 120 may also cause the user interface 400 to depict the barrier 440, such as if the barrier 440 is in good condition or is otherwise capable of stopping the flow of water to at least some degree. If the barrier 440 is present in the geographic area, but is no longer in good condition or has deteriorated to the point that the barrier 440 may not stop the flow of all water, then the user interface 400 may not depict the barrier 440 and/or may depict the barrier 440 with markings or annotations indicating that the barrier 440 is in a bad condition and may not stop the flow of water. As described above, if the barrier 440 is capable of stopping at least some water, then the flood footprint estimation system 120 may take into account the elevation(s) of the barrier 440 when performing the comparisons.

Figure 5A:
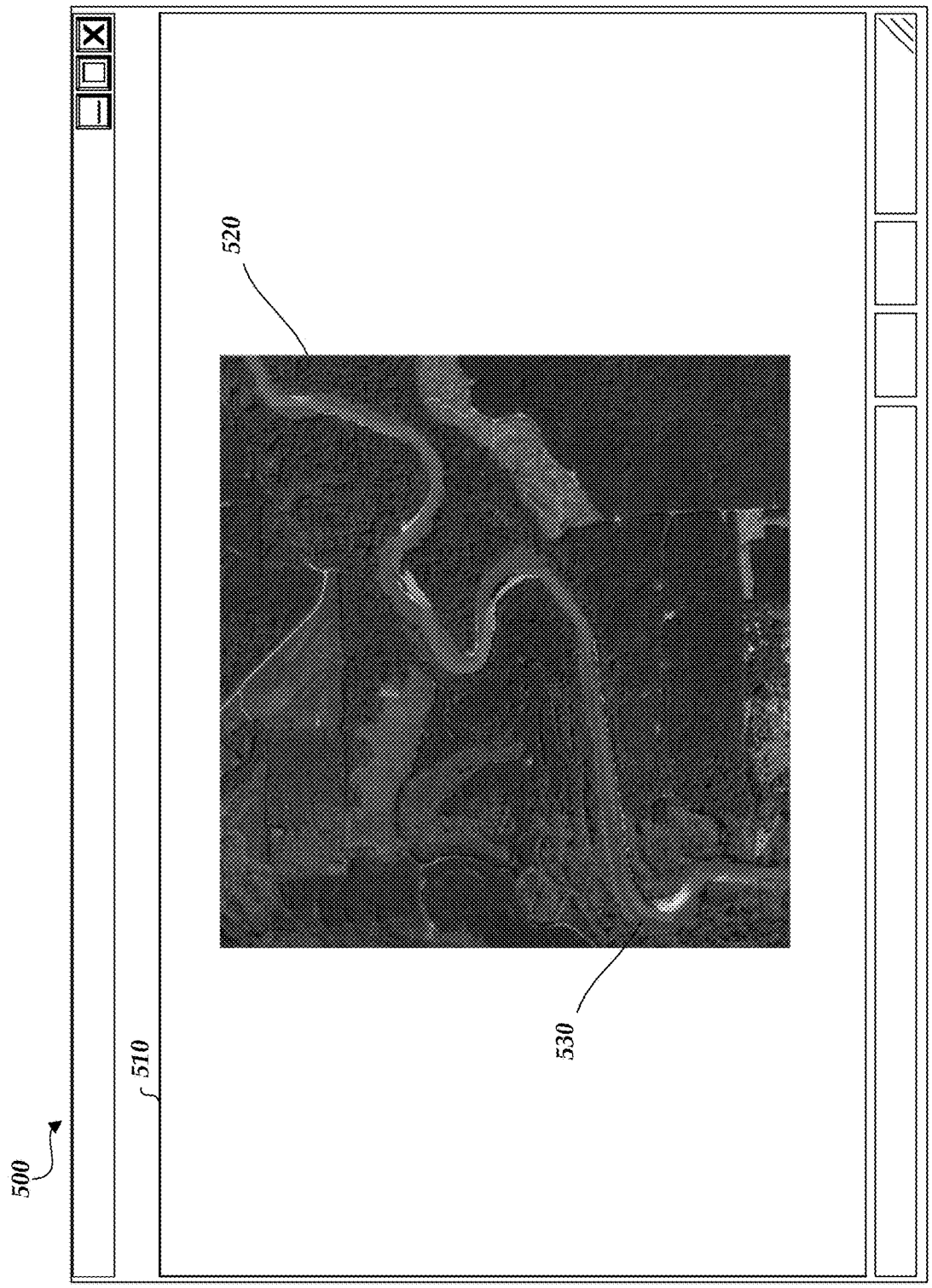
FIGS. 5A-5C illustrate an example user interface depicting an image of a geographic area in which current, historical, or future flooding is indicated given different conditions.
Figure 5B:
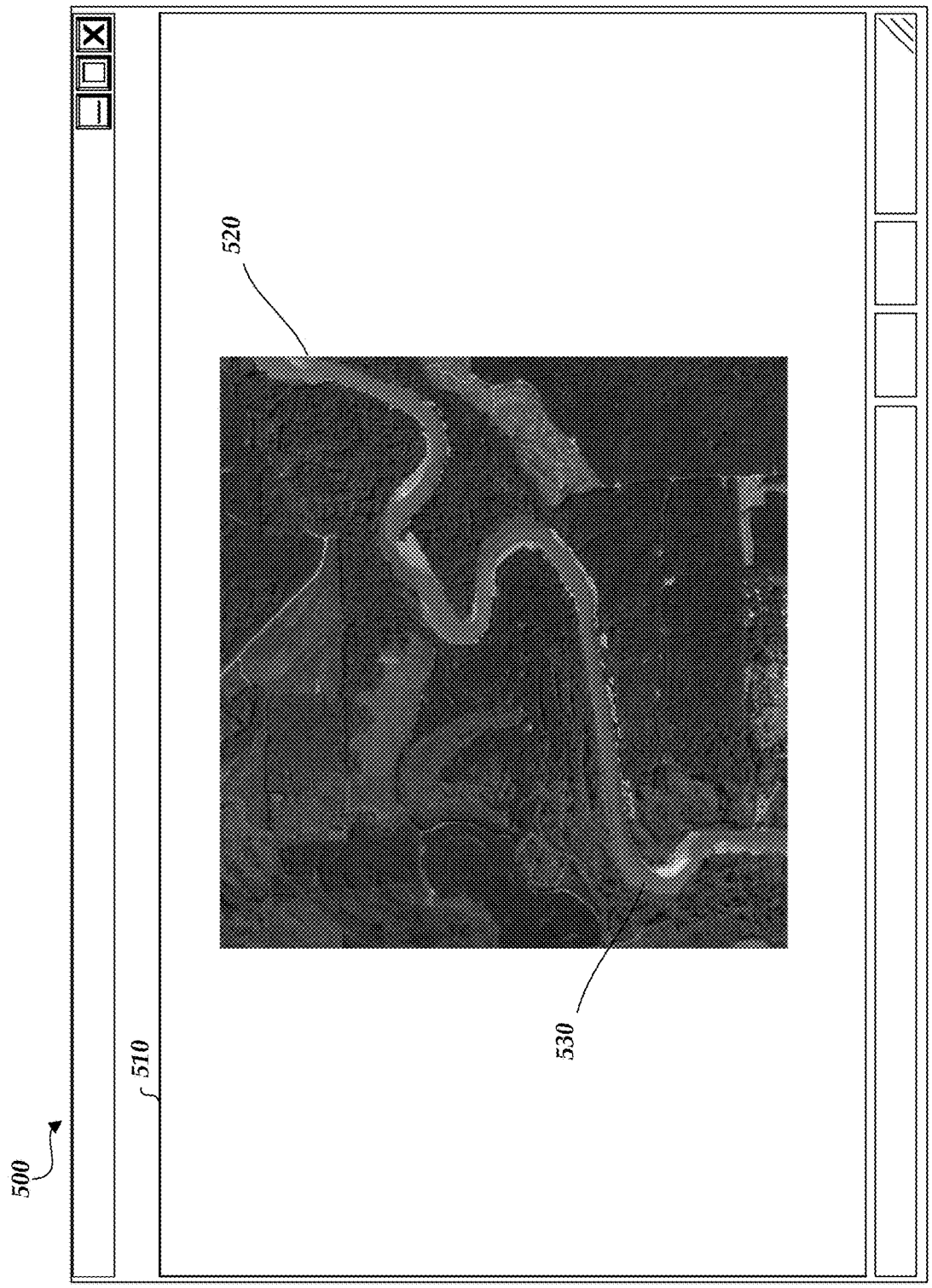
Figure 5C:
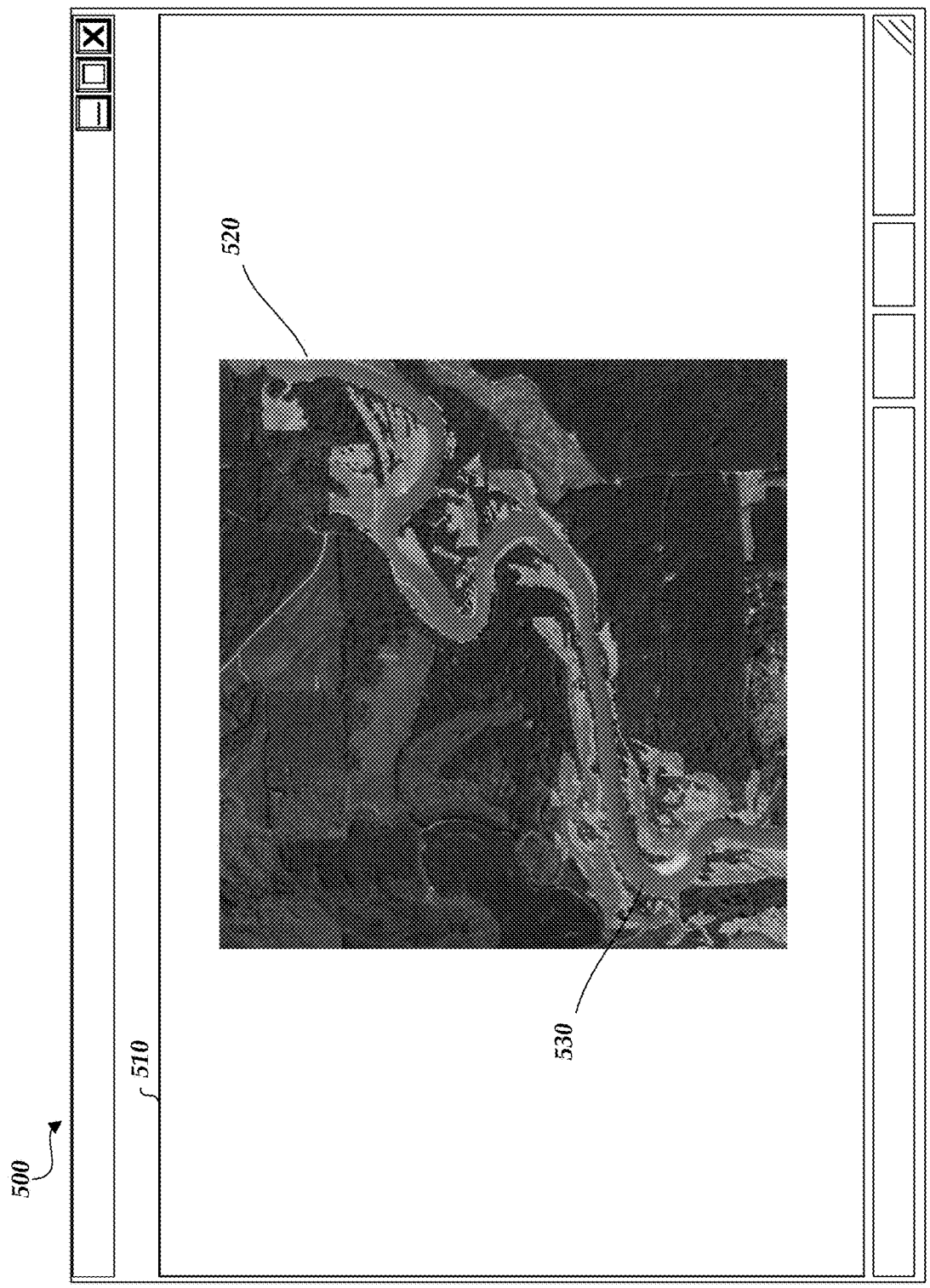

FIGS. 5A-5C illustrate an example user interface 500 depicting an image 520 of a geographic area in which current, historical, or future flooding is indicated given different conditions. The user interface 500 may be rendered and displayed by a user device 102 in response to the user device 102 processing user interface data generated by the user interface generator 123.

As illustrated in FIG. 5A, the image 520 is displayed within a pane 510 of the user interface 500. The image 520 depicts a river 530 that has water generally flowing from a bottom of the pane 510 to a top of the pane 510. Initially, a user device 102 may have requested a flood footprint indicating the flooding that is occurring at a current time, at a first historical time, or at a first future time given specified conditions. As a result, the flood footprint estimation system 120 may perform the operations described herein and provide user interface data to the user device 102. The user device 102 can then process the user interface data that, when processed, causes the user interface 102 to render and display the image 520. As shown in the image 520, there may be no flooding or minimal flooding given that water from the river 530 has not exited the banks of the river 530. The image 520 may display water using a certain color (e.g., at least one shade of blue, where a darker shade may indicate deeper water and a lighter shade may indicate shallower water) to indicate which portions of the depicted geographic area are underwater and which portions are not.

After receiving the user interface data that caused the user device 102 to display the user interface 500 illustrated in FIG. 5A, the user device 102 may request an update on the current conditions, a flood footprint at a second historical time before or after the first historical time, or a flood footprint at the first future time or another future time given worse conditions than those specified in the initial request. As illustrated in FIG. 5B, the user device 102 has received updated user interface data, which causes the user device 102 to render and display the user interface 500 displaying the image 520 showing additional flooding corresponding to the river 530.

Similarly, after receiving the user interface data that caused the user device 102 to display the user interface 500 illustrated in FIG. 5B, the user device 102 may request an update on the current conditions, a flood footprint at a third historical time before or after the first and/or second historical times, or a flood footprint at the first future time or another future time given worse conditions than those specified in the initial request and in the second request. As illustrated in FIG. 5C, the user device 102 has received updated user interface data, which causes the user device 102 to render and display the user interface 500 displaying the image 520 showing even more flooding corresponding to the river 530.

Although not shown, the user interface 500 may include user interface elements that allow a user device 102 to specify the parameters used by the flood footprint estimation system 120 to generate a flood footprint, such as whether the flood footprint is for a current, historical, or future time, any variables that should affect the desired flood footprint (e.g., a threshold value or percentage plus or minus an estimated water surface elevation, stream flow data, velocity data, barrier conditions, etc.), whether the user interface 500 should be updated periodically (e.g., every 30 seconds) to show current conditions, and/or the like.

Example Water Expansion Routine

Figure 6:
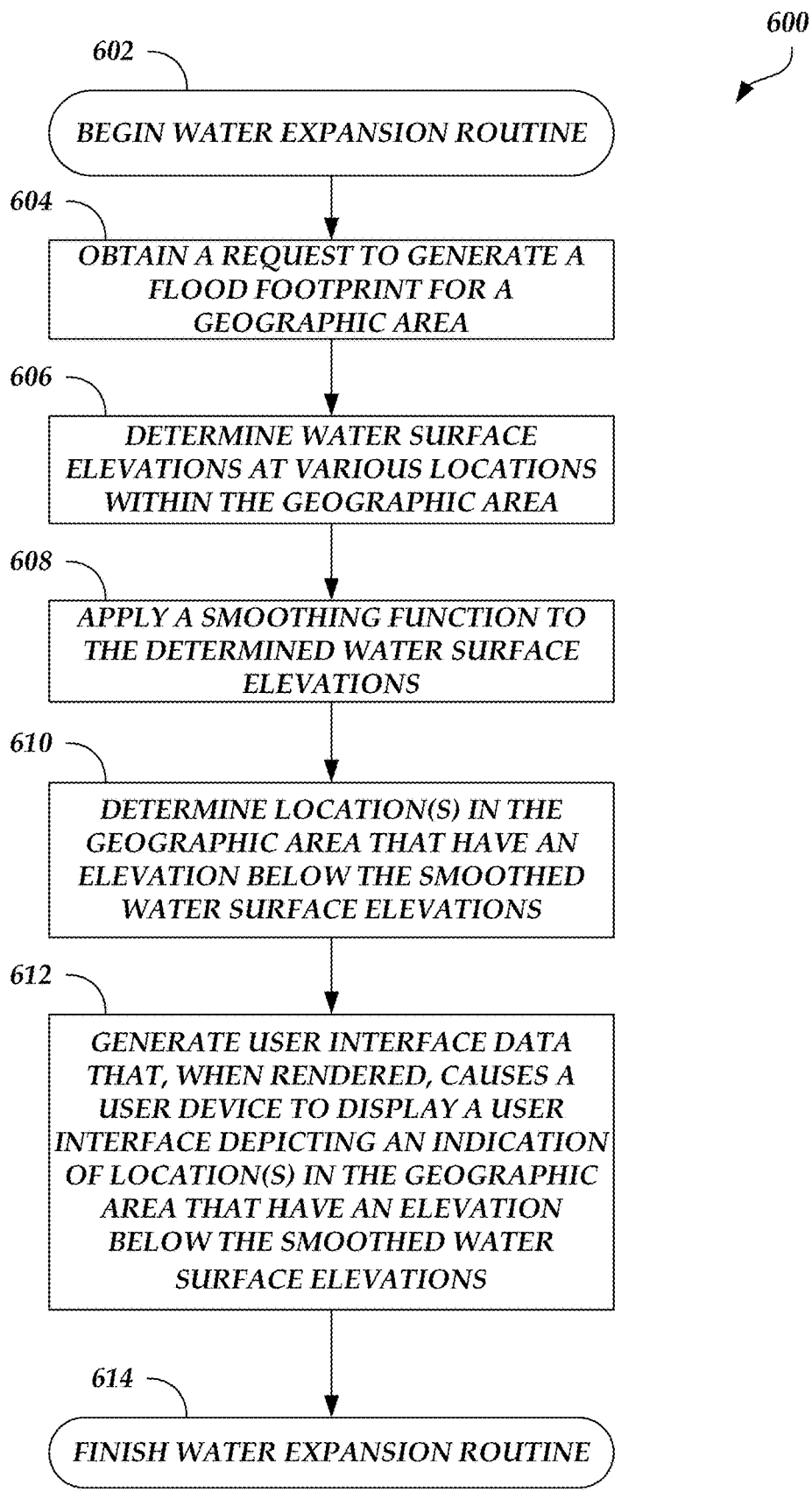
FIG. 6 is a flow diagram depicting a water expansion routine illustratively implemented by a flood footprint estimation system, according to one embodiment.

FIG. 6 is a flow diagram depicting a water expansion routine 600 illustratively implemented by a flood footprint estimation system, according to one embodiment. As an example, the flood footprint estimation system 120 of FIG. 1 can be configured to execute the water expansion routine 600. The water expansion routine 600 begins at block 602.

At block 604, a request to generate a flood footprint for a geographic area is obtained. The geographic area may include one or more bodies of water that could cause flooding. The request may include additional parameters, such as whether the flood footprint is for a current, historical, or future time, any variables that should affect the desired flood footprint (e.g., a threshold value or percentage plus or minus an estimated water surface elevation, stream flow data, velocity data, barrier conditions, etc.), whether a user interface should be updated periodically (e.g., every 30 seconds) to show current conditions, and/or the like.

At block 606, water surface elevations at various locations within the geographic area is determined. For example, one or more water surface elevation values can be determined for each body of water in the geographic area. The water surface elevation values can be determined by creating cross-sectional areas and using stream flow data and/or velocity data, by selecting a section of a body of water and selecting water surface elevations to form a volume and using stream flow data, and/or by retrieving the water surface elevation values from an external source.

At block 608, a smoothing function is applied to the determined water surface elevations. For example, for each set of water surface elevations corresponding to a particular body of water, the flood footprint estimation system 120 can sort or order the water surface elevations by location from which the values originate (e.g., where the first value corresponds to a location at or closer to the source of the body of water and where the last value corresponds to a location at or closer to the mouth of the body of water) and apply a smoothing function to the sorted water surface elevations. Application of the smoothing function may produce a trend line or curve that generally trends downward from the source to the mouth of the body of water.

At block 610, one or more locations in the geographic area that have an elevation below the smoothed water surface elevations is determined. For example, an iterative water expansion process, such as the process described herein, can be used to determine the location(s) in the geographic area that have an elevation below the smoothed water surface elevations.

At block 612, user interface data is generated that, when rendered by a user device 102, causes the user device 102 to display a user interface depicting an indication of the location(s) in the geographic area that have an elevation below the smoothed water surface elevations. For example, the user interface may include pixels shaded a certain color (e.g., blue) to indicate which location(s) are underwater. After the user interface data is generated, the water expansion routine 600 ends, as shown at block 614.

Additional Embodiments

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 102 may execute an application (e.g., a browser, a stand-alone application, etc.) that allows a user to submit claims, view captured images, set flight path parameters, modify a flight path during flight, view estimated repair costs and/or submitted bids, and/or select a bid. A user device 102 can be operated by a property owner, a claims adjuster, a contractor, and/or similar personnel.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising." "including." "having." and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A flood footprint estimation system for generating a flood footprint, the flood footprint estimation system comprising:
   memory storing computer-executable instructions; and
   a hardware processor in communication with the memory, wherein the computer-executable instructions, when executed by the hardware processor, cause the hardware processor to:
   obtain, from a user device, a request to generate a flood footprint for a geographic area at a first time, wherein the geographic area comprises a first body of water;
   determine one or more water surface elevation values at various points along the first body of water;
   apply a smoothing function to the determined one or more water surface elevation values to generate one or more smoothed water surface elevation values in which the one or more smoothed water surface elevation values decrease from a source of the first body of water toward a mouth of the first body of water;
   determine one or more locations in the geographic area that have an elevation below the one or more smoothed water surface elevation values;
   generate user interface data that, when rendered by the user device, causes the user device to display a user interface depicting an indication of the one or more locations that have an elevation below the one or more smoothed water surface elevation values at the first time to mitigate damage or loss of life during a flood event at the first time; and transmit the user interface data to the user device.

2. The flood footprint estimation system of claim 1, wherein each of the one or more smoothed water surface elevation values corresponds to a pixel in an image depicting the geographic area.

3. The flood footprint estimation system of claim 2, wherein the computer-executable instructions, when executed, further cause the hardware processor to:

for a first pixel in the image corresponding to a first smoothed water surface elevation value in the one or more smoothed water surface elevation values, identify a second pixel in the image that borders the first pixel;

determine a land elevation value of land represented by the second pixel using topography data;

compare the land elevation value to the first smoothed water surface elevation value; and determine that the land represented by the second pixel is below the first smoothed water surface elevation in response to a determination that the land elevation value is less than the first smoothed water surface elevation value.

4. The flood footprint estimation system of claim 3, wherein the computer-executable instructions, when executed, further cause the hardware processor to:

for the second pixel, identify a third pixel in the image that borders the second pixel;

determine a second land elevation value of land represented by the third pixel using topography data;

compare the second land elevation value to the first smoothed water surface elevation value;

determine that the land represented by the third pixel is above the first smoothed water surface elevation in response to a determination that the second land elevation value is greater than the first smoothed water surface elevation value; and refrain from analyzing any pixels in the image that border the third pixel and that are farther than the third pixel from the first pixel in association with the first body of water.

5. The flood footprint estimation system of claim 1, wherein the geographic area comprises a second body of water, and wherein the computer-executable instructions, when executed, further cause the hardware processor to:

determine one or more second water surface elevation values at various points along the second body of water;

apply the smoothing function to the determined one or more second water surface elevation values to generate one or more smoothed second water surface elevation values; and determine one or more second locations in the geographic area that have an elevation below the one or more smoothed second water surface elevation values, wherein the user interface depicts an indication of the one or more second locations that have an elevation below the one or more smoothed second water surface elevation values.

6. The flood footprint estimation system of claim 1, wherein the computer-executable instructions, when executed, further cause the hardware processor to:

sort the determined one or more water surface elevation values such that a first water surface elevation value in the sorted one or more water surface elevation values corresponds to a point along the body of water closest to the source of the body of water and a last water surface elevation value in the sorted one or more water surface elevation values corresponds to a point along the body of water closest to the mouth of the body of water; and apply the smoothing function to the sorted one or more water surface elevation values.

7. The flood footprint estimation system of claim 1, wherein each water surface elevation value in the one or more smoothed water surface elevation values has a value that is no greater than a value of a water surface elevation value previous to the respective water surface elevation value in the one or more smoothed water surface elevation values.

8. The flood footprint estimation system of claim 1, wherein the user interface depicts an image representing the geographic area, wherein a pixel in the image is colored a first color to indicate the one or more locations that have an elevation below the one or more smoothed water surface elevation values.

9. The flood footprint estimation system of claim 1, wherein the request comprises an indication of whether the flood footprint should be generated based on one of current conditions, historical conditions, or future conditions.

10. The flood footprint estimation system of claim 1, wherein the computer-executable instructions, when executed, further cause the hardware processor to one of determine the one or more water surface elevation values based on one or more cross-sectional areas or obtain the one or more water surface elevation values from an external source.

11. A computer-implemented method for generating a flood footprint, the computer-implemented method comprising:

as implemented by one or more computing devices configured with specific computer-executable instructions, obtaining, from a user device, a request to generate a flood footprint for a geographic area at a first time, wherein the geographic area comprises a first body of water;

determining one or more water surface elevation values at various points along the first body of water;

applying a smoothing function to the determined one or more water surface elevation values to generate one or more smoothed water surface elevation values in which the one or more smoothed water surface elevation values decrease from a source of the first body of water toward a mouth of the first body of water;

determining one or more locations in the geographic area that have an elevation below the one or more smoothed water surface elevation values;

generating user interface data that, when rendered by the user device, causes the user device to display a user interface depicting an indication of the one or more locations that have an elevation below the one or more smoothed water surface elevation values at the first time to mitigate damage or loss of life during a flood event at the first time; and transmitting the user interface data to the user device.

12. The computer-implemented method of claim 11, wherein each of the one or more smoothed water surface elevation values corresponds to a pixel in an image depicting the geographic area.

13. The computer-implemented method of claim 12, wherein determining one or more locations in the geographic area further comprises:
for a first pixel in the image corresponding to a first smoothed water surface elevation value in the one or more smoothed water surface elevation values,
identifying a second pixel in the image that borders the first pixel;
determining a land elevation value of land represented by the second pixel using topography data;
comparing the land elevation value to the first smoothed water surface elevation value; and
determining that the land represented by the second pixel is below the first smoothed water surface elevation in response to a determination that the land elevation value is less than the first smoothed water surface elevation value.

14. The computer-implemented method of claim 13, wherein determining one or more locations in the geographic area further comprises:
for the second pixel,
identifying a third pixel in the image that borders the second pixel;
determining a second land elevation value of land represented by the third pixel using topography data;
comparing the second land elevation value to the first smoothed water surface elevation value;
determining that the land represented by the third pixel is above the first smoothed water surface elevation in response to a determination that the second land elevation value is greater than the first smoothed water surface elevation value; and
refraining from analyzing any pixels in the image that border the third pixel and that are farther than the third pixel from the first pixel in association with the first body of water.

15. The computer-implemented method of claim 11, further comprising:
determining one or more second water surface elevation values at various points along the second body of water;
applying the smoothing function to the determined one or more second water surface elevation values to generate one or more smoothed second water surface elevation values; and
determining one or more second locations in the geographic area that have an elevation below the one or more smoothed second water surface elevation values, wherein the user interface depicts an indication of the one or more second locations that have an elevation below the one or more smoothed second water surface elevation values.

16. The computer-implemented method of claim 11, wherein applying a smoothing function further comprises:
sorting the determined one or more water surface elevation values such that a first water surface elevation value in the sorted one or more water surface elevation values corresponds to a point along the body of water closest to the source of the body of water and a last water surface elevation value in the sorted one or more water surface elevation values corresponds to a point along the body of water closest to the mouth of the body of water; and
applying the smoothing function to the sorted one or more water surface elevation values.

17. The computer-implemented method of claim 11, wherein each water surface elevation value in the one or more smoothed water surface elevation values has a value that is no greater than a value of a water surface elevation value previous to the respective water surface elevation value in the one or more smoothed water surface elevation values.

18. The computer-implemented method of claim 11, wherein the user interface depicts an image representing the geographic area, wherein a pixel in the image is colored a first color to indicate the one or more locations that have an elevation below the one or more smoothed water surface elevation values.

19. Non-transitory, computer-readable storage media comprising computer-executable instructions for generating a flood footprint, wherein the computer-executable instructions, when executed by a computer system, cause the computer system to:
obtain, from a user device, a request to generate a flood footprint for a geographic area at a first time, wherein the geographic area comprises a first body of water;
determine one or more water surface elevation values at various points along the first body of water;
apply a smoothing function to the determined one or more water surface elevation values to generate one or more smoothed water surface elevation values in which the one or more smoothed water surface elevation values decrease from a source of the first body of water toward a mouth of the first body of water;
determine one or more locations in the geographic area that have an elevation below the one or more smoothed water surface elevation values;
generate user interface data that, when rendered by the user device, causes the user device to display a user interface depicting an indication of the one or more locations that have an elevation below the one or more smoothed water surface elevation values at the first time to mitigate damage or loss of life during a flood event at the first time; and
transmit the user interface data to the user device.

20. The non-transitory, computer-readable storage media of claim 19, wherein each of the one or more smoothed water surface elevation values corresponds to a pixel in an image depicting the geographic area, and wherein the computer-executable instructions further cause the computer system to:
for a first pixel in the image corresponding to a first smoothed water surface elevation value in the one or more smoothed water surface elevation values,
identify a second pixel in the image that borders the first pixel;
determine a land elevation value of land represented by the second pixel using topography data;
compare the land elevation value to the first smoothed water surface elevation value; and
determine that the land represented by the second pixel is below the first smoothed water surface elevation in response to a determination that the land elevation value is less than the first smoothed water surface elevation value.

* * * * *